United States Patent [19]

House

[11] Patent Number: 4,464,274

[45] Date of Patent: Aug. 7, 1984

[54] ORGANOPHILIC CLAY SUSPENDING AGENTS

[75] Inventor: Roy F. House, Houston, Tex.

[73] Assignee: Venture Innovations, Inc., Lafayette, La.

[21] Appl. No.: 491,265

[22] Filed: May 4, 1983

Related U.S. Application Data

[63] Continuation-in-part of Ser. No. 292,408, Aug. 13, 1981, Pat. No. 4,382,868.

[51] Int. Cl.$^3$ .......................... C10M 5/20; C10M 5/24
[52] U.S. Cl. ......................................... 252/28; 252/49; 252/315.2; 252/351; 252/8.5 P
[58] Field of Search ...................... 252/28, 315.2, 49.2

[56] References Cited

U.S. PATENT DOCUMENTS

| | | | |
|---|---|---|---|
| 3,654,171 | 4/1972 | Emond et al. | 252/28 |
| 3,755,166 | 8/1973 | Abbott et al. | 252/28 |
| 3,812,937 | 5/1974 | Abbott et al. | 252/28 |
| 4,040,974 | 8/1977 | Wright et al. | 252/28 |
| 4,116,866 | 9/1978 | Finlayson | 252/28 |
| 4,287,086 | 9/1981 | Finlayson et al. | 252/28 |

*Primary Examiner*—Jacqueline V. Howard
*Attorney, Agent, or Firm*—Roy F. House

[57] ABSTRACT

The invention provides methods of preparing organophilic clay suspending agents having enhanced dispersibility in oleaginous liquids, the organophilic clay containing suspending agents, and methods of increasing the viscosity of oleaginous liquids utilizing these suspending agents. The suspending agents are of particular use in mineral oil based invert emulsion drilling fluids.

16 Claims, No Drawings

ORGANOPHILIC CLAY SUSPENDING AGENTS

This patent application is a continuation-in-part of co-pending patent application Ser. No. 06/292,408 filed on Aug. 13, 1981, now U.S. Pat. No. 4,382,868, which is incorporated herein by reference for all purposes including obtaining the benefit of the earlier filing date for all inventions claimed herein which were disclosed in the co-pending application.

The present invention relates to organophilic clays, particularly organophilic clay suspending additives of the type obtained by reacting an attapulgite or sepiolite clay with a quaternary cationic organic compound, and methods of preparing such organophilic clays.

It is well known that organic compounds which contain a cation will react with clays which have an anionic surface and exchangeable cations to form organoclays. Depending on the structure and quantity of the organic cation and the characteristics of the clay, the resulting organoclay may be organophilic and hence have the property of swelling or dispersing and gelling in certain organic liquids depending on the concentration of organoclay, the degree of shear applied, and the presence of a dispersant. See for example the following U.S. patents, all incorporated herein by reference for all purposes U.S. Pat. Nos. 2,531,427 (Hauser); 2,966,506 (Jordan); 4,105,578 (Finlayson and Jordan); 4,208,218 (Finlayson); and the book "Clay Mineralogy", 2nd Edition, 1968 by Ralph E. Grim, McGraw-Hill Book Co., Inc., particularly Chapter 10—Clay Mineral-Organic Reactions, pp. 356-368—Ionic Reactions, Smectite, and pp. 392-401—Organophilic Clay-Mineral Complexes.

Many uses have been proposed for organophilic clays, particularly as thickeners and/or suspending agents in oleaginous liquids, such as for example, in oil base drilling fluids, oil base packer fluids, greases and the like. Such uses are disclosed in several U.S. patents including: U.S. Pat. Nos. 2,531,812 (Hauser); 3,831,678 (Mondshine); 3,537,994 (House); and others referenced herein.

Despite the myriad of organoclays disclosed in the prior art, there are relatively few which have found any appreciable utility. The organoclays available commercially utilize either montmorillonite (particularly bentonite), hectorite or attapulgite as the clay reactant and a quaternary ammonium salt selected from the group consisting of dimethyl dihydrogenatedtallow ammonium chloride, dimethyl benzyl hydrogenatedtallow ammonium chloride, methyl benzyl dihydrogenatedtallow ammonium chloride, and mixtures of the first two salts as the cationic reactant.

One of the problems in utilizing any organoclay is obtaining good dispersion of the organoclay in the desired oleaginous liquid. Since the commercial introduction of organophilic clays it has become well known to gain the maximum gelling (thickening) efficiency from these organophilic clays by adding a low molecular weight polar organic material to the composition. Such polar organic materials have been variously called dispersants, dispersion aids, solvating agents, dispersion agents and the like. See for example the following U.S. patents: O'Halloran U.S. Pat. No. 2,677,661; McCarthey et al. U.S. Pat. No. 2,704,276; Stratton U.S. Pat. No. 2,833,720; Stratton U.S. Pat. No. 2,879,229; Stransfield et al. U.S. Pat. No. 3,294,683. An excellent review of the variables which affect the gelation of oils by organophilic clays to form greases is given by C. J. Boner in his book "Manufacture and Applications of LUBRICATING GREASES", 1954 (Reinhold Publishing Corp.), pp. 724-748—Clay Base Thickeners.

The dispersion of an organophilic clay in an oleaginous liquid is increased as the degree of shear applied to the mixture increases, particularly when a polar organic dispersant is present in the mixture. Heat may also be useful in obtaining good dispersion although heat and shear alone or in combination, without a dispersant being present, do not efficiently disperse the organoclay.

Generally in preparing oil base well working compositions, such as invert emulsion drilling, workover, completion, and packer fluids, high shear mixing equipment such as a colloid mill is not utilized nor are the polar organic dispersants. Rather the water present in the emulsion, which generally comprises from about 10% to about 50% by volume of the liquid phase, is utilized as the dispersant. While water can function as a dispersant for certain organophilic clays, it is a poor dispersant and inefficient thickening or suspension is obtained from the organoclay.

I have found that organophilic clays prepared by extruding a mixture of a clay selected from the group consisting of attapulgite, sepiolite, and mixtures thereof, a quaternary cationic organic compound, water and an alcohol having from 1 to 5 carbon atoms in certain specified ratios are readily dispersible in oleaginous liquids provided that the organophilic clay is not dried to remove the moisture or alcohol therefrom.

Accordingly, it is an object of this invention to provide organoclay viscosifiers which are more easily dispersed in oleaginous liquids than prior art organoclay viscosifiers.

It is another object of this invention to provide methods for the manufacture of organoclay viscosifiers which have enhanced dispersibility in oleaginous liquids.

Yet another object of this invention is to provide a method of suspending particulate materials in an oleaginous liquid.

Other objects and advantages of this invention will become apparent to one skilled in the art upon reading this specification and the appended claims.

The organophilic clays prepared by the process of this invention comprise the reaction product of a clay selected from the groups consisting of attapulgite, sepiolite, and mixtures thereof, and an organic quaternary compound.

The clay must have a cation exchange capacity of at least 25 milliequivalents per 100 grams of 100% active clay. The clay may be converted to the sodium form if they are not already in this form. This can conveniently be accomplished by preparing an aqueous clay slurry and passing the slurry through a bed of cation exchange resin in the sodium form, optionally with centrifugation to remove the non-clay impurities from the smectite clay, and spray drying the slurry to obtain a particulate form of sodium exchanged clay. Alternatively the clay can be mixed with water and a soluble sodium compound such as sodium bicarbonate, sodium carbonate, sodium hydroxide and the like, optionally with an alkaline earth metal compound selected from the group consisting of magnesium oxide, magnesium carbonate, magnesium hydroxide, calcium oxide, calcium hydroxide, and mixtures thereof, and shearing the mixture such as with a pugmill or extruder.

The cation exchange capacity of the clay can be determined by the well known ammonium acetate method.

The activity of the clay should be known in order to prepare the organophilic clays of this invention. When it is desired to react the ray clay or any clay which is not 100% active, the percent active clay can be determined using the following procedure: (1) To 350 ml. of water in a stainless steel Multimixer container add 2 ml. of a 5% tetrasodium pyrophosphate solution and agitate; (2) Sift in 20 grams of ground clay and continue the agitation for 20 minutes, periodically scraping the sides of the container; (3) Withdraw from the slurry while it is being agitated two samples of approximately 20 ml. each; (4) Determine the total solids in one of the samples; (5) Pour the second sample into two 10 ml. test tubes and centrifuge the samples at 1700 rpm for one minute (6" spin diameter); (6) Pour out the supernatent phase from each tube and determine the total solids therein; (7) The percent active clay can be calculated using the following formula:

$$\% \text{ Active Clay} = \frac{\% \text{ Solids in Supernatent Phase}}{\% \text{ Solids in Original Slurry}} \times 100$$

The organic quaternary compounds useful in the practice of this invention are selected from the group consisting of quaternary ammonium salts, quaternary phosphonium salts, and mixtures thereof. Representative quaternary phosphonium salts are disclosed in the following U.S. patents, all incorporated herein by reference: U.S. Pat. Nos. 3,929,849 (Oswald) and 4,053,493 (Oswald). Representative quaternary ammonium salts are disclosed in U.S. Pat. No. 4,081,496 (Finlayson), incorporated herein by reference, in addition to the patents previously cited herein.

The preferred quaternary compounds comprise a quaternary ammonium salt having the structural formula:

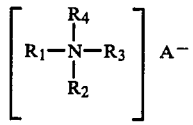

wherein $R_1$, $R_2$, $R_3$, and $R_4$ are independently selected from the group consisting of $C_aH_{2a+1-x}B_x$, $C_bH_{2b-1-x}B_x$, $C_6H_{5-x}B_xCH_2$, and mixtures thereof, $1 \leq a \leq 30$, $3 \leq b \leq 30$, $0 \leq x \leq 2$, B is a radical selected from the group consisting of OH, Cl, Br, $C_6H_5$, and mixtures thereof, and A is a charge balancing anion, provided that at least one R contains at least 12 carbon atoms, and $R_1$, $R_2$, $R_3$, and $R_4$ collectively contain at least 20 carbon atoms. Most preferably $x=0$, and B is OH when $x>0$. A is preferably selected from the group consisting of Cl, Br, I, $NO_2$, OH, $CH_3SO_4$, and mixtures thereof, most preferably Cl.

Exemplary preferred quaternary ammonium cations are selected from the group consisting of trimethyl octadecyl ammonium, trimethyl hydrogenatedtallow ammonium, trimethyl ricinoleyl ammonium, dimethyl didodecyl ammonium, dimethyl dioctadecyl ammonium, dimethyl dicoco ammonium, dimethyl dihydrogenatedtallow ammonium, dimethyl diricinoleyl ammonium, dimethyl benzyl octadecyl ammonium, dimethyl benzyl hydrogenatedtallow ammonium, dimethyl benzyl ricinoleyl ammonium, methyl benzyl dioctadecyl ammonium, methyl benzyl dihydrogenatedtallow ammonium, methyl benzyl diricinoleyl ammonium, methyl benzyl dicoco ammonium, methyl dibenzyl octadecyl ammonium, methyl dibenzyl hydrogenatedtallow ammonium, methyl dibenzyl ricinoleyl ammonium, methyl dibenzyl coco ammonium, methyl trioctadecyl ammonium, methyl trihydrogenatedtallow ammonium, methyl triricinoleyl ammonium, methyl tricoco ammonium, dibenzyl dicoco ammonium, dibenzyl dihydrogenatedtallow ammonium, dibenzyl dioctadecyl ammonium, dibenzyl diricinoleyl ammonium, tribenzyl hydrogenatedtallow ammonium, tribenzyl dioctadecyl ammonium, tribenzyl coco ammonium, tribenzyl ricinoleyl ammonium, and mixtures thereof.

The amount of the organic quaternary cationic compound added to the clay must be sufficient to render the resulting organoclay useful for its intended purpose. Generally there is a specific ratio of clay and quaternary compound which provides the optimum desired property in an oleaginous medium, and this ratio will vary depending on the characteristics of the oleaginous medium.

The preferred organophilic clays of this invention have a ME ratio from about 20 to about 60. The optimum ME ratio will depend on the particular clay and cationic quaternary compound used to prepare the organophilic clay, and on the particular oleaginous liquid in which it is desired to utilize the organophilic clay. In general, it has been found that the suspending efficiency of organophilic clays in polar organic liquids increases as the ME ratio decreases. Conversely, the gelling efficiency of organophilic clays in non-polar oleaginous liquids increases as the ME ratio increases until an optimum is reached which is generally in the range from about 90% to about 110% of the base exchange capacity of the clay, depending on the particular oleaginous liquid to be viscosified.

The processes of this invention result in the preparation of organophilic clays which have enhanced dispersibility as compared to prior art processes for making the organophilic clays. Thus it is anticipated that organophilic clays can be prepared by the processes of this invention which may have utility in certain oleaginous mediums and which may not have any such utility if prepared by the prior art processes. For instance, organophilic clays can be prepared at lower ME ratios by the processes of this invention than by the dispersed clay processes of the prior art, and these organophilic clays should be dispersible in selected organic liquids to provide useful properties therein.

It is also anticipated that other organic cationic compounds can be used to prepare organoclays by the processes of this invention which would have no utility, due to a lack of dispersibility, if prepared by prior art processes. Thus it has been variously disclosed to prepare organoclays from primary amine salts, secondary amine salts, tertiary amine salts, diamine salts, partial amides of polyamines, polyquaternary ammonium compounds, and the like. However, the efficiency of these organoclays in various organic liquids is poor which is due in part to the poor dispersibility of these organoclays in the organic liquids.

The organophilic clays produced by the processes of this invention are provided in particulate form.

Thus the invention provides a particulate gellant comprising from about 40% to about 65% of an organophilic clay, from about 1% to about 15% of an alcohol having from 1 to 5 carbon atoms, and from about 20% to about 59% water. Preferably the particulate gellant contains from about 45% to about 60% of an organophilic clay, from about 1.5% to about 12.5% of said alcohol, and from about 27.5% to about 53.5% water. Most preferably, the gellant contains from about 45% to about 60% by weight of the organophilic clay, from about 2% to about 10% of said alcohol, and from about 30% to about 53.5% of water.

The process of this invention for preparing the particulate gellant comprises extruding a mixture containing the clay, organic cationic compound, water, and an alcohol containing from 1 to 5 carbon atoms, and thereafter grinding the organophilic clay extrudate without drying the water or alcohol therefrom. Preferably the clay, organic cationic compound, and alcohol are intimately mixed together before adding the water thereto. As noted previously, the amount of organic quaternary compound is preferably in the range from about 20 to about 60 milliequivalents per 100 grams of clay, 100% active clay basis, and most preferably from about 30 to about 50. The amount of water present in the mixture should be from about 20% to about 59% by weight, and most preferably from about 27.5% to about 53.5%. The amount of alcohol should be from about 1% to about 15% by weight, most preferably from about 1.5% to about 12.5%.

The organophilic clay, for the purposes of this invention, is considered to be the combination of the moisture free clay, including the solid impurities therein, and the organic cationic compound on a 100% active basis. Thus for instance, if 100 parts of a clay containing 10% moisture and 20% non-clay solid impurities were reacted with 50 parts of a 75% active quaternary ammonium chloride, then the amount of organophilic clay obtained would be 90+37.5=127.5 parts.

It has been found that the organophilic clay resulting from this processing has enhanced dispersibility in oleaginous liquids as compared to the organophilic clay (having the same ME ratio of clay and organic cationic compound) prepared by the prior art processes.

The term "extruding" as used in connection with the present invention is intended to mean any type of processing in which the clay, organic cationic compound, water, and alcohol are intimately mixed under sufficient pressure for the clay and organic cationic compound to react. The intensity of mixing is such that heat is evolved during the extrusion. Thus applicable equipment for conducting the extruding step are extruders, pug mills, 2-roll mills, and the like.

The alcohols useful in this invention are the lower molecular weight alcohols containing from 1 to 5 carbon atoms. Representative alcohols are methanol, ethanol, propanol, isopropanol, butanol, pentanol, and the like. Preferred alcohols contain 1 to 3 carbon atoms, i.e., methanol, ethanol, propanol, isopropanol, and mixtures thereof. Most preferred is isopropanol.

Other water soluble low molecular weight polar organic liquids may be used as a replacement for the alcohol, or at least as a partial replacement. Such liquids may be ketones, amides, nitriles, nitro compounds, esters, carbonates, and the like, such as acetone, dimethyl formamide, acetonitrile, nitromethane, methyl formate, propylene carbonate, etc.

The organophilic clays of this invention are useful as thickeners or suspending agents in organic liquids. The preferred organophilic clays are efficient suspending agents in oleaginous liquids, particularly for use in oil or gas well drilling fluids, workover fluids, completion fluids, coring fluids, packer fluids, and the like. Such fluids are well known.

A further embodiment of this invention is to provide a method of increasing the viscosity of an organic liquid which comprises mixing with the organic liquid the particulate organoclay suspending agent of this invention. Thus, the invention also comprises a method for increasing the viscosity of an organic liquid which comprises: extruding a mixture containing a clay, an organic cationic compound, water, and an alcohol containing from 1 to 5 carbon atoms, and thereafter dispersing the organophilic clay-containing extrudate into the organic liquid.

The following examples illustrate specific preferred embodiments of the invention and are not intended to be limiting. Certain quaternary ammonium salts such as dimethyl dihydrogenatedtallow ammonium chloride are solid or semi-solid at room temperature even in the presence of substantial quantities of a solvent such as isopropanol or isopropanol/water solutions. It has been found that the viscosity of such mixtures can be decreased by shearing the mixture. Thus a 75% mixture of dimethyl dihydrogenatedtallow ammonium chloride in an 18/7 solution of isopropanol/water is a semi-solid which upon shearing in a Waring Blendor becomes pourable, and appears to be a suspension of dimethyl dihydrogenatedtallow ammonium chloride particles in the isopropanol/water solution.

The following examples illustrate specific embodiments of the invention and are not included to be limiting. All percentages are by weight unless otherwise indicated.

Organoclay samples were prepared by mixing together 60 parts of attapulgite clay containing 9.6 parts water and the amount of dimethyl dihydrogenatedtallow ammonium chloride (80% active in a mixture of 72% isopropanol and 28% water) indicated in Table 1 with a Waring Blendor. The indicated amount of water was added and mixed in a Waring Blendor. This mixture was extruded by passing it three times through a laboratory extruder. Thereafter the sample was ground in a Waring Blendor. The samples had the composition indicated in Table 1.

The organoclay samples were evaluated by mixing together for five minutes on a Waring Blendor 262.5 cc. diesel oil and sufficient organoclay sample to provide 20 grams of organoclay solids. After obtaining the API rheology (columns A in Table 2), sufficient water was added to adjust the total water content to 87.5 cc. After mixing an additional five minutes, the API rheologies were determined (columns B in Table 2). Thereafter 10 grams of invert oil emulsifier and 10 grams of lime were added and the mixing continued for five minutes. The rheological values obtained are given in Table 2, columns C.

The data indicate that the most preferred organoclay for us as suspending agents in invert oil emulsion drilling fluids contain at least about 2% by weight alcohol (isopropanol) and 35-50% by weight water, as evidenced by the high yield point to plastic viscosity ratio (YP/PV) in the presence of the emulsifier.

TABLE 1

Organoclay Compositions

| Organoclay | Parts DMDHTAC* | Parts H₂O | Sample Composition | | |
|---|---|---|---|---|---|
| | | | % Organoclay | % Water | % IPA |
| 1 | 8 | 50 | 48.25 | 50.25 | 1.50 |
| 2 | 9 | 40 | 53.03 | 45.04 | 1.93 |
| 3 | 10.5 | 40 | 53.42 | 44.37 | 2.21 |
| 4 | 12 | 50 | 49.52 | 48.19 | 2.29 |
| 5 | 12 | 40 | 53.79 | 43.73 | 2.48 |
| 6 | 12 | 30 | 58.87 | 38.42 | 2.71 |
| 7 | 13.5 | 50 | 49.92 | 47.55 | 2.53 |
| 8 | 13.5 | 40 | 54.15 | 43.10 | 2.75 |
| 9 | 13.5 | 30 | 59.17 | 37.83 | 3.00 |

*100% Active basis

TABLE 2

Organoclay Evaluations
API Rheology

| Organoclay | A | | | B | | | C | | |
|---|---|---|---|---|---|---|---|---|---|
| | PV | YP | 10-Sec gel | PV | YP | 10-Sec gel | PV | YP | 10-Sec gel |
| 1 | 22 | 2 | 2 | 30 | 42 | 36 | 19 | 6 | 4 |
| 2 | 9 | 7 | 4 | 17 | 18 | 15 | 15 | 4 | 1 |
| 3 | 12 | 4 | 5 | 20 | 15 | 13 | 15 | 5 | 3 |
| 4 | 12 | 6 | 4 | 20 | 15 | 10 | 15 | 10 | 4 |
| 5 | 12 | 19 | 5 | 17 | 27 | 18 | 16 | 11 | 6 |
| 6 | 10 | 11 | 5 | 17 | 27 | 17 | 18 | 9 | 5 |
| 7 | 11 | 9 | 5 | 16 | 29 | 15 | 16 | 16 | 8 |
| 8 | 14 | 5 | 5 | 20 | 33 | 18 | 18 | 14 | 8 |
| 9 | 13 | 5 | 4 | 19 | 23 | 15 | 16 | 14 | 8 |

I claim:

1. The method of producing an organoclay suspending agent which comprises extruding a mixture containing a clay selected from the group consisting of attapulgite, sepiolite, and mixtures thereof, from about 20 to about 60 milliequivalents per 100 grams of 100% active clay of a quaternary compound selected from the group consisting of quaternary ammonium salts, quaternary phosphonium salts, and mixtures thereof, from about 20% to about 59% by weight of water, and from about 1% to about 15% by weight of an alcohol containing from 1 to 5 carbon atoms, and thereafter grinding the organoclay gellant without removing the water or alcohol therefrom.

2. The method of claim 1 wherein said clay is attapulgite.

3. The method of claim 1 wherein said clay is sepiolite.

4. The method of claim 1 wherein the amount of said quaternary compound is from about 30 to about 50 milliequivalents per 100 grams of 100% active clay, the amount of water is from about 27.5% to about 53.5% by weight, and the amount of alcohol is from about 1.5% to about 12.5% by weight.

5. The method of claim 4 wherein said clay is attapulgite.

6. The method of claims 1, 2, 4, or 5, wherein said alcohol is isopropanol.

7. An organoclay suspending agent comprising from about 40% to about 65% of an organophilic clay, from about 1.0% to about 15% of an alcohol having from 1 to 5 carbon atoms, and from about 20% to about 59% water, said gellant being prepared by the process of claim 1.

8. The agent of claim 7 wherein said organophilic clay is the reaction product of attapulgite clay and a quaternary compound selected from the group consisting of quaternary ammonium salts, quaternary phosphonium salts, and mixtures thereof.

9. The agent of claim 7 wherein the amount of said quaternary compound is from about 30 to 50 milliequivalents per 100 grams of 100% active clay.

10. The agent of claim 9 wherein said clay is attapulgite.

11. The agent of claim 9 wherein said clay is sepiolite.

12. The agent of claims 7, 8, 9, 10 or 11 which contains from about 45% to about 60% of said organoclay, from about 1.5% to about 12.5% of said alcohol, and from about 27.5% to about 53.5% water.

13. The agent of claims 7, 8, 9, 10, or 11, wherein said alcohol is isopropanol.

14. The agent of claims 7, 8, 9, 10, or 11, which contains from about 45% to about 60% of said organoclay, from about 2.0% to about 10% of isopropanol, and from about 30% to about 53% water.

15. A method of increasing the viscosity of an oleaginous liquid which comprises extruding a mixture containing a clay selected from the group consisting of attapulgite, sepiolite, and mixtures thereof, from about 20 to about 60 milliequivalents per 100 grams of 100% active clay of a quaternary compound selected from the group consisting of quaternary ammonium salts, quaternary phosphonium salts, and mixtures thereof, from about 20% to about 59% by weight of water, and from about 1% to about 15% by weight of an alcohol containing from 1 to 5 carbon atoms, and thereafter dispersing the extrudate into the oleaginous liquid without removing the water of alcohol therefrom.

16. A method of increasing the viscosity of an oleaginous liquid which comprises mixing with the oleaginous liquid the gellant of claims 7, 8, 9, 10, or 11.

* * * * *